US007518524B1

(12) United States Patent
Aiello et al.

(10) Patent No.: US 7,518,524 B1
(45) Date of Patent: Apr. 14, 2009

(54) ANNOUNCEMENTS TO FACILITATE DETECTION OF WIRELESS DEVICES

(75) Inventors: Gaetano Roberto Aiello, San Diego, CA (US); Timothy Leo Gallagher, Encinitas, CA (US)

(73) Assignee: Staccato Communications, Inc., San Diego, CA (US)

( * ) Notice: Subject to any disclaimer, the term of this patent is extended or adjusted under 35 U.S.C. 154(b) by 125 days.

(21) Appl. No.: 11/246,895

(22) Filed: Oct. 6, 2005

(51) Int. Cl.
*G08B 21/00* (2006.01)
(52) U.S. Cl. ............ 340/686.6; 340/539.1; 340/539.11; 340/825.36; 340/825.49
(58) Field of Classification Search .............. 340/539.1, 340/539.11, 825.36, 825.49, 686.6
See application file for complete search history.

(56) References Cited

U.S. PATENT DOCUMENTS

| | | | |
|---|---|---|---|
| 5,581,548 A | 12/1996 | Ugland et al. | |
| 5,911,120 A | 6/1999 | Jarett et al. | |
| 6,608,559 B1* | 8/2003 | Lemelson et al. | 340/539.13 |
| 6,624,750 B1* | 9/2003 | Marman et al. | 340/506 |
| 6,882,851 B2 | 4/2005 | Sugar et al. | |
| 6,975,673 B1 | 12/2005 | Rouquette | |
| 7,161,941 B1 | 1/2007 | Schmidl et al. | |
| 2002/0045444 A1 | 4/2002 | Usher et al. | |
| 2003/0198305 A1 | 10/2003 | Taylor et al. | |
| 2004/0090933 A1 | 5/2004 | McFarland et al. | |
| 2004/0102222 A1 | 5/2004 | Skafidas et al. | |
| 2004/0141548 A1 | 7/2004 | Shattil | |
| 2004/0151109 A1 | 8/2004 | Batra et al. | |
| 2004/0156456 A1 | 8/2004 | Wu et al. | |
| 2004/0203474 A1 | 10/2004 | Miller et al. | |
| 2005/0008729 A1 | 1/2005 | Fernandez et al. | |
| 2005/0054294 A1 | 3/2005 | Khun-Jush et al. | |
| 2005/0111415 A1 | 5/2005 | Soomro et al. | |
| 2005/0136933 A1 | 6/2005 | Sandhu et al. | |
| 2005/0149443 A1 | 7/2005 | Torvinen | |
| 2005/0152314 A1 | 7/2005 | Sun et al. | |
| 2005/0164642 A1 | 7/2005 | Roberts | |
| 2005/0176371 A1 | 8/2005 | Palin et al. | |
| 2005/0181752 A1 | 8/2005 | Sahota | |
| 2005/0202853 A1 | 9/2005 | Schmitt et al. | |
| 2005/0239455 A1 | 10/2005 | Stephens | |
| 2006/0171445 A1 | 8/2006 | Batra et al. | |
| 2006/0188003 A1 | 8/2006 | Larsson | |
| 2007/0021065 A1 | 1/2007 | Sengupta et al. | |
| 2007/0025313 A1 | 2/2007 | Bhagwat et al. | |
| 2007/0147236 A1 | 6/2007 | Lee | |

* cited by examiner

*Primary Examiner*—Daryl C Pope
(74) *Attorney, Agent, or Firm*—Van Pelt, Yi & James LLP

(57) ABSTRACT

Announcing to a detector of a wireless device is disclosed. An announcement regarding the presence of the wireless device is obtained. The announcement is transmitted wireless medium to the detector of the wireless device.

20 Claims, 10 Drawing Sheets

ANNOUNCEMENTS TO FACILITATE DETECTION OF WIRELESS DEVICES

BACKGROUND OF THE INVENTION

As wireless devices become more common, interference between wireless devices correspondingly may increase. Transmissions are conveyed over a shared wireless medium and a wireless device receives a combination of all transmission. This may be a particular problem when wireless devices conform to different wireless protocols. To mitigate interference, a wireless device may detect and avoid other wireless devices and in particular avoid wireless devices that conform to a different wireless protocol. New wireless protocols are being developed, and detection methods that address these new wireless protocols may be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of announcing to a detector of a wireless device is disclosed. In some embodiments, the method may be performed by a wireless device being detected. An announcement regarding presence is obtained. In some embodiments, the announcement is obtained from memory and may be a frame. The announcement is transmitted in a wireless medium to the detector of the wireless device.

Figure 1:
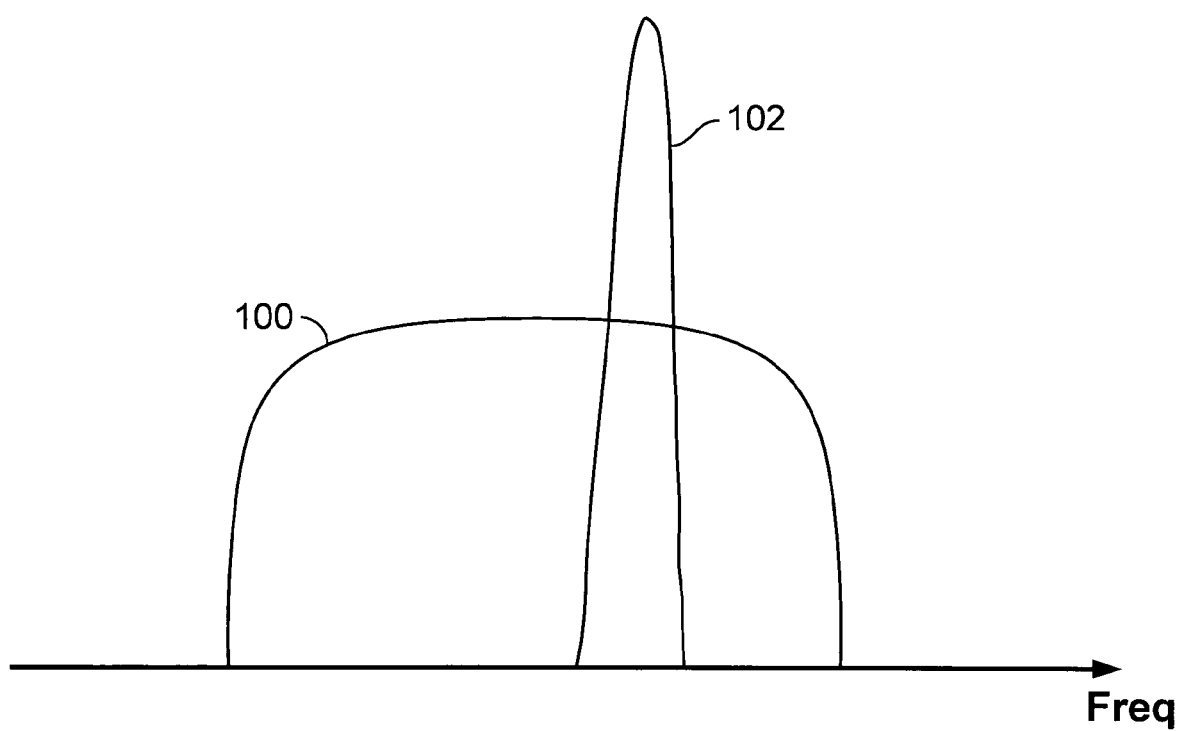
FIG. 1 is a spectrum illustrating an example of interfering signals.

FIG. 1 is a spectrum illustrating an example of interfering signals. In the example shown, signals 100 and 102 are transmitted by different wireless devices that may conform to different wireless protocols that specify transmission power, access mechanisms, encoding, modulation, frame formats, bands (including width), etc. Some example wireless protocols are narrowband protocols such as IEEE 802.11 (also referred to as WiFi), Bluetooth, and IEEE 802.16 (also referred to as WiMax) and wideband protocols such as WiMedia and the proposed IEEE 802.15.3a draft.

The two wireless devices are located sufficiently close enough to each other for signals 100 and 102 to interfere. Signals 100 and 102 may result in an increased error rate at a receiver because the signals combine in the wireless medium. A combination of signals 100 and 102 is received and receiver processing may not be sufficient to correct for the error introduced by the combination of the two signals. Reduced access to a wireless channel may result from interfering signals 100 and 102. For example, some wireless devices access the medium by sensing the medium before transmitting. If another device is transmitting, the wireless device waits to transmit. Opportunities to transmit may be reduced.

To mitigate interference, a wireless device may detect another wireless device and take appropriate measures. This is referred to as detection and avoidance. The detection process may be based on the wireless protocol used by a device. For example, detection may be directed at wireless devices that do not conform to the wireless protocol of a detecting wireless device. Interference between wireless devices conforming to the same wireless protocol may be less of a concern than wireless devices that do not conform to the same wireless protocol. In some cases, wireless devices use different wireless protocols, but the two wireless protocols are compatible. Detection in some embodiments is not directed towards wireless devices that conform to compatible wireless protocols. In some cases, an intended receiver of narrowband signal 102 is more severely affected by the combination of signals 100 and 102 than an intended receiver of wideband signal 100. In some embodiments, a wideband wireless device attempts to detect the presence of narrowband wireless devices.

Although in the example illustrated signal 100 is a wideband signal and signal 102 is a narrowband signal, interfering signals of other bandwidths may be detected. Detection methods illustrated herein may be applied to a variety of interference scenarios: two narrowband wireless devices, two wideband wireless devices, more than two wireless devices, etc.

Figure 2:
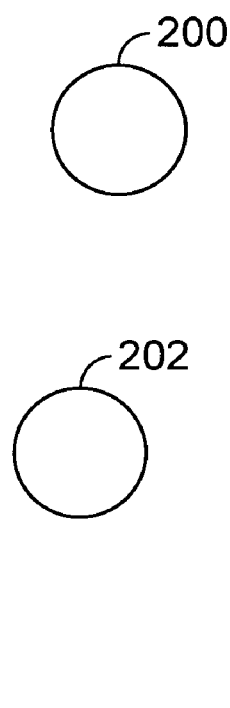
FIG. 2 is a diagram illustrating wireless devices located in the vicinity of each other.
Figure 2:
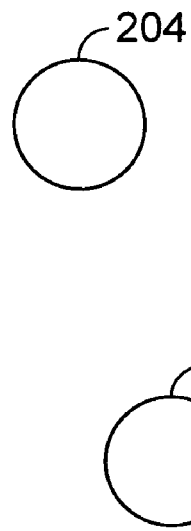

FIG. 2 is a diagram illustrating wireless devices located in the vicinity of each other. In the example shown, wireless device 200 is attempting to detect other wireless devices.

Wireless devices 202, 204 and 206 are in proximity to detecting wireless device 200, and detecting wireless device 200 may be unaware of undetected wireless device 206. Detection of a wireless device may be based on receiving a transmission from a wireless device. In some cases, detection based on receiving a transmission may be difficult because a wireless device is not transmitting. For example, some wireless devices join a group of wireless devices by listening before transmitting. Wireless device 206 may wait to transmit until appropriate information is received from a member of an existing group. Detection of a wireless device may also be difficult if many wireless devices are transmitting. For example, undetected wireless device 206 may be transmitting, but transmissions from wireless devices 202 and 204 may impede detection of undetected wireless device 206 by detecting wireless device 200. Transmission contributions from wireless devices 202 and 204 may raise a noise floor for a detection process.

A detection process may therefore include creating a situation for a wireless device being detected to transmit. A device performing detection may promote and take advantage of a detection friendly environment with respect to undetected wireless device 206. Such an environment may be in the time domain or the frequency domain. For example, there may be a period of time during which wireless devices 200, 202, and 204 refrain from transmitting. This may create a window of low energy for undetected wireless device 206 to receive information from an existing group (if needed), transmit, and be detected by detecting wireless device 200. This may also allow detecting wireless device 200 to receive a transmission with little or no contributions from wireless devices 202 and 204. In some embodiments, these periods may be explicitly defined and respected by wireless devices 200, 202, and 204. In some embodiments, policies are implemented at wireless devices 200, 202, 204 to increase the likelihood of such a period occurring.

In some embodiments, a detection friendly environment is in the frequency domain. For example, a particular band may not be used by wireless devices 200, 202 and 204. As in the time domain, this may create a low noise floor for undetected wireless device 206 to receive (if needed), transmit, and/or reduce contributions from wireless devices 202 and 204 received by detecting wireless device 200. In some embodiments, the band used may be dedicated for detection. A band used for detection may be a band other than that normally used by detecting wireless device 200 or by undetected wireless device 206. A band other than the band normally used may be referred to as "out of band." In some embodiments, a detection friendly environment is described by the time domain and the frequency domain.

Wireless devices in some embodiments share detection related information. For example, detecting wireless device 200 may detect the presence of wireless device 206. Detecting device 200 may communicate detection of device 206 to wireless devices 202 and 204. In some embodiments, fields within a frame are used. Bits in a beacon frame may be used to communicate the presence of wireless device 206. A wireless device that receives such a beacon frame may become aware of wireless device 206 by examining fields in the beacon frame. In some embodiments, the detection information communicated is with respect to the transmitting wireless device. The wireless devices detected and reported by detecting wireless device 200 may be different from the wireless devices detected and reported by wireless device 202, for example because of their respective proximity to a given device. In some embodiments, information collected by wireless devices in one band is shared with another group of wireless devices in another band.

Using such an environment in the time and/or frequency domain, a transmission may be received and used to detect the presence of wireless devices. The example below illustrates some modules within a wireless device associated with detection.

Figure 3:
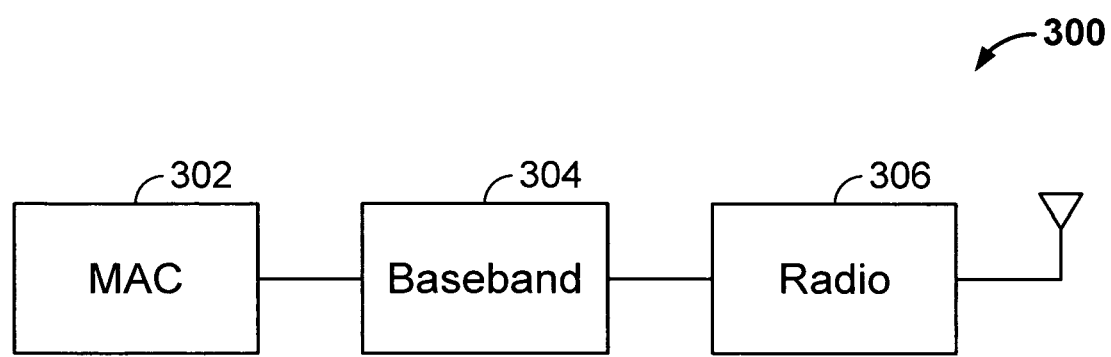
FIG. 3 is a system diagram illustrating an example of wireless device.

FIG. 3 is a system diagram illustrating an example of wireless device. In the example shown, wireless device 300 may be a narrowband wireless device that transmits signal 100, or may be a wideband wireless device that transmits signal 102. Medium access controller (MAC) 302 is coupled to baseband 304, which in turn is coupled to radio 306. During transmission, MAC 302 passes a frame to baseband 304. A wireless protocol may describe the format of a frame. Information communicated in a frame may include information associated with the wireless device or a group the wireless device is a member of. Baseband 304 performs processing on the frame (such as an Inverse Fast Fourier Transform (IFFT), encoding, and modulation) that may be described by a wireless protocol. Analog I and Q signals are output from baseband 304 and are passed to radio 306. The I and Q signals are combined with an appropriate carrier frequency band to generate a transmitted signal. Corresponding inverse processes are applied in the receive path.

MAC 302 may create a detection friendly environment or process received information to detect a wireless device. For example, MAC 302 may transmit a frame that defines a detection friendly period of time. Corresponding MAC modules of receiving wireless devices refrain from transmitting during that period. MAC 302 may also process received information to detect a wireless device. For example, using information from a received frame, MAC 302 may be able to detect the presence of another wireless device. The information may be fields in a received frame, such as a source address or identification of a protocol used. In some embodiments, an additional radio and/or an additional baseband in addition to baseband 304 and radio 306 is used.

Processes associated with detection may be performed by baseband 304. For example, to promote a detection friendly environment, baseband 304 may not transmit at certain frequencies. Baseband 304 may process received data to detect wireless devices. For example, a frequency band used by wireless device 300 may include multiple subcarriers. Baseband 304 may include a Fast Fourier Transform (FFT) in the receiver path to produce samples for each subcarrier from a received time domain signal. Wireless device 300 may be a wideband device and one or more of the subcarriers may correspond to a narrowband of interest. Baseband 304 may use samples generated by an FFT to detect the presence of another wireless device. The presence of a wireless device may be indicated by certain characteristics, and baseband 304 may examine samples in the subcarriers for those characteristics. For example, if samples in subcarriers corresponding to a narrowband signal of interest are non-zero but samples in the rest of the subcarriers are zero or sufficiently lower than the non-zero values, baseband 304 may indicate it has detected a narrowband wireless device.

In some embodiments, a baseband in addition to baseband 304 is used to detect a wireless device. The additional baseband may include fewer components than baseband 304 which used for normal transmission/reception. For example, the additional baseband may detect a wireless device by examining samples of subcarriers generated by an FFT. Subsequent processes in the receive path after the FFT in some embodiments are not performed in the additional baseband.

The additional baseband may not necessarily be coupled to a MAC, and further processing after the FFT may not be necessary.

Figure 4:
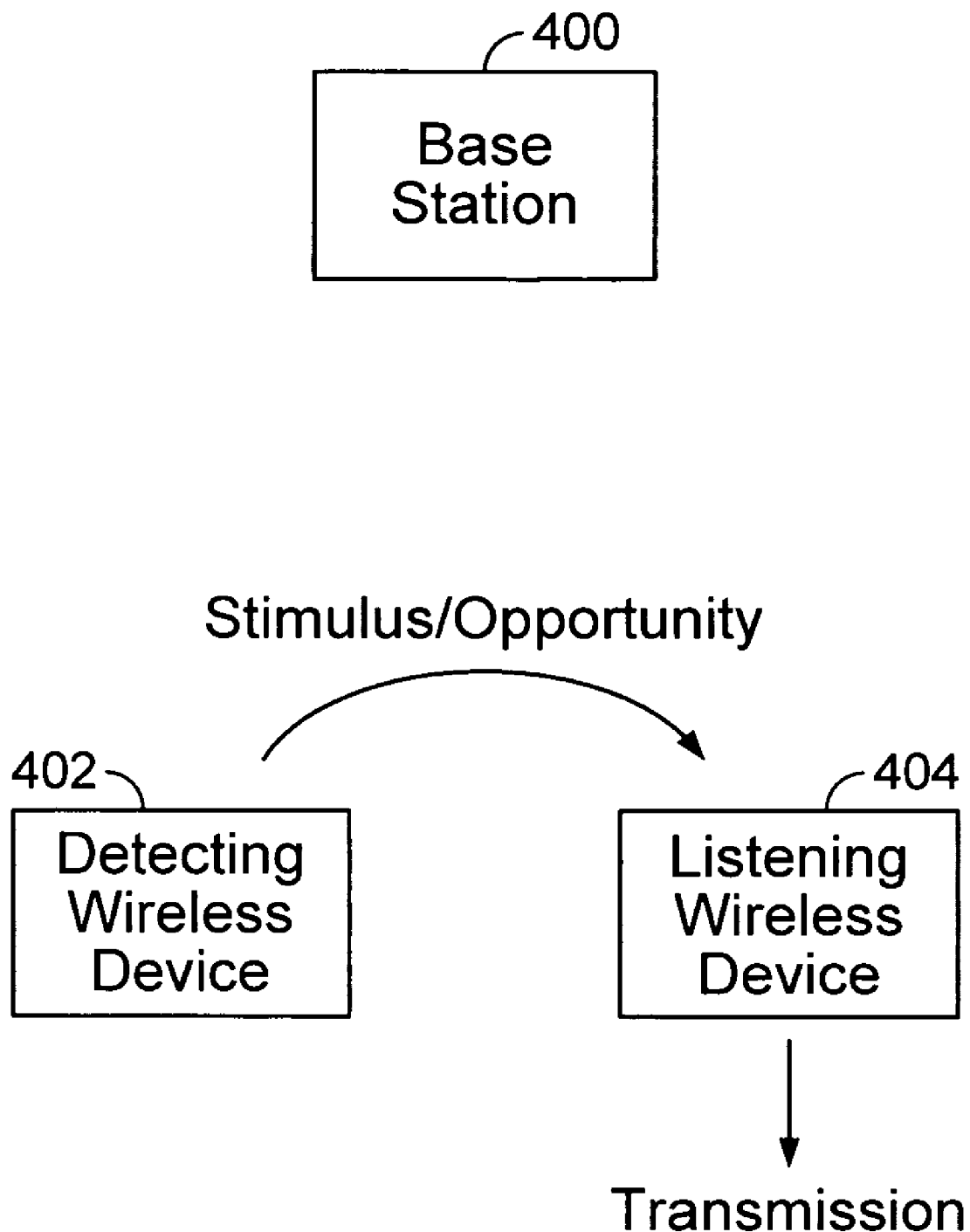
FIG. 4 is a diagram illustrating creation of a situation for a wireless device to transmit.

FIG. 4 is a diagram illustrating creation of a situation for a wireless device to transmit. In the example shown, detecting wireless device 402 is attempting to detect other wireless devices and may be unaware of listening wireless device 404. Listening wireless device 404 is attempting to join a group that includes base station 400. Base station 400 and listening wireless device 404 may be WiMax wireless devices. Detecting wireless device 402 may be a wideband wireless device. In this example, detecting wireless device 402 is in relatively close proximity to listening device 404, whereas base station 400 is relatively far away from listening station 404. Listening wireless device 404 may be in a listening state and may not transmit until it receives a beacon frame from base station 400. It may be even more difficult to detect listening wireless device 404 if detecting wireless device 402 has a full transmit queue. It may be difficult for listening wireless device 404 to receive an error-free beacon because of transmission contributions from the detecting wireless device.

To create a situation for listening device 404 to transmit, in some embodiments detecting wireless device 402 stimulates listening wireless device 404. For example, detecting wireless device may transmit a frame that a listening wireless device responds to. Detecting wireless device 402 may periodically transmit these frames to stimulate any listening wireless devices. The format of a transmitted frame may conform to a wireless protocol of interest. For example, if detecting wireless device 402 wants to detect a WiMax device, a frame assembled according to the WiMax protocol may be transmitted. The type of frame used may depend on how a device joins a group. For example, if listening devices are waiting to receive a beacon frame, a beacon frame may be transmitted.

In some embodiments, a detecting wireless device 402 attempts to prevent listening wireless device 404 from joining a non-existent group in response to the stimulus. For example, handshaking may be used when a listening wireless device joins a group. If a listening wireless device transmits a request to join a group in response to a stimulus, detecting wireless device 402 may refrain from responding or may deny the request. The handshaking process may be incomplete and listening device 404 continues to look for base station 400. In some wireless protocols, a member of a group may be forced to leave the group. Detecting wireless device may transmit a second frame so that listening wireless device 404 returns to the listening state and continues to look for base station 400.

In some embodiments, detecting wireless device 402 creates an opportunity for listening wireless device to transmit. For example, detecting wireless device may refrain from transmitting so that listening wireless device 404 may receive transmissions from base station 400 and transmit to join a group. A wireless device performing detection may periodically perform this in order to detect new wireless devices. In some embodiments, detecting wireless device 400 and other wireless devices (not shown) mutually refrain from transmitting. The other wireless devices refraining from transmission and detecting wireless device 400 may be members of the same group. Multiple wireless devices refraining from transmission may be scheduled, or may occur randomly.

In some embodiments, a wireless device determines whether to stimulate a listening device or provide an opportunity for a wireless device to transmit. The decision may be based on power levels of detecting wireless device 402. For example, if a detecting wireless device has a large or unlimited power supply (such as an AC power supply) then power consumption may not be a concern and either technique may be used. Other parameters particular to an application may be then be used to make a decision. A controller may evaluate a battery level and switch from one method to another.

Stimulating or providing an opportunity for listening wireless device 404 to transmit may be attractive in some applications since listening wireless device 404 may not need to be modified. For example, IEEE 802.11 (WiFi) devices have been sold for a number of years. Detecting wireless devices using a method described above may enable detection of existing and future WiFi devices without design changes to the wireless devices being detected. In other embodiments, a wireless device being detected transmits of its own accord to facilitate detection, which may correspond to a design change.

Figure 5:
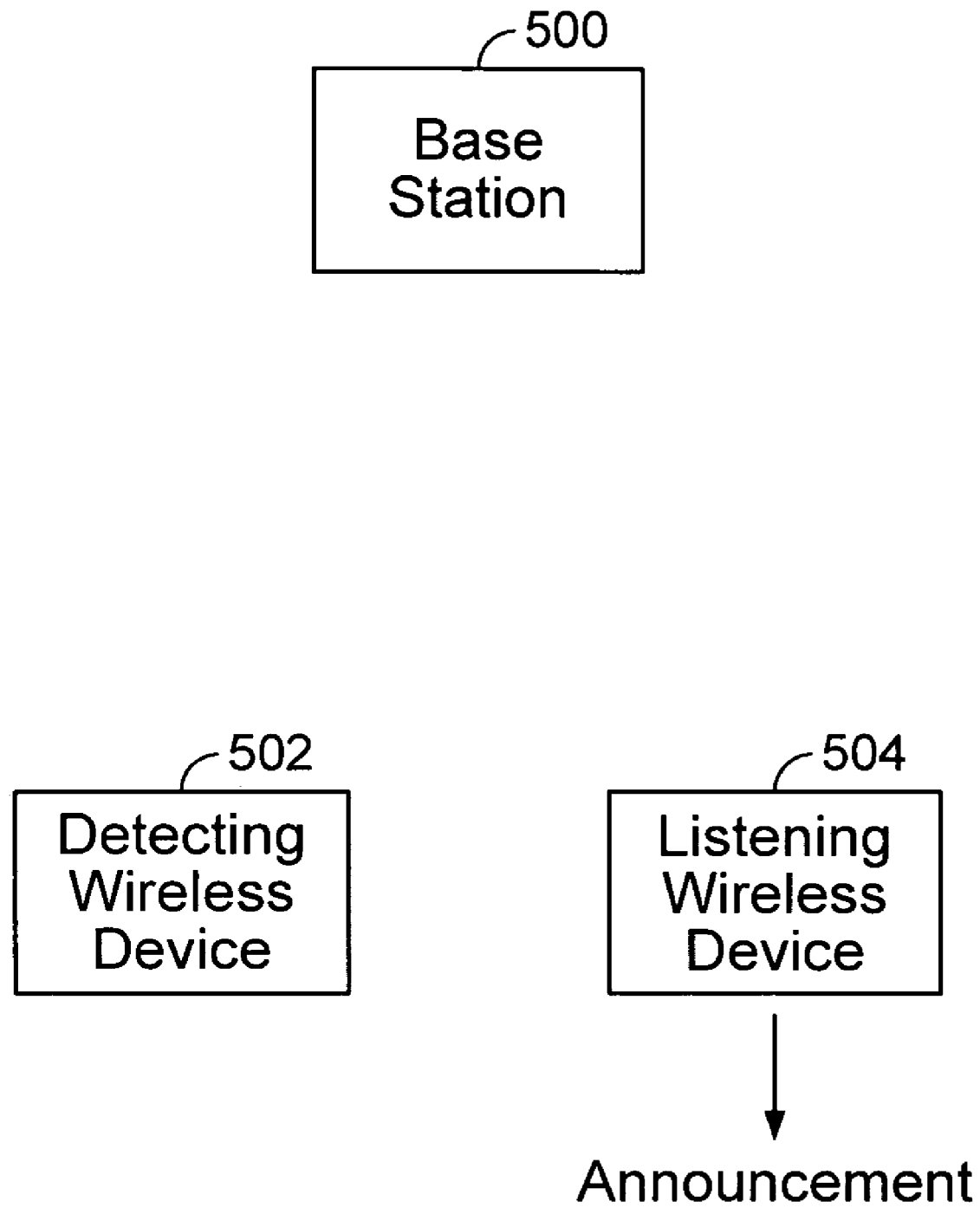
FIG. 5 is a diagram illustrating a wireless device being detected transmitting to facilitate detection.

FIG. 5 is a diagram illustrating a wireless device being detected transmitting to facilitate detection. In the example shown, the wireless devices illustrated are similar to the devices of FIG. 4. Base station 500 is relatively far from listening wireless device 504, and detecting wireless device 502 is relatively close to listening wireless device 504. In this example, listening wireless device 504 transmits an announcement to assist detecting wireless device 502. Detecting wireless device 502 receives the announcement and detects listening wireless device 504. In some embodiments, an announcement is transmitted during the listening state. Transmission of an announcement may occur periodically for the benefit of detecting wireless devices entering the vicinity of listening wireless device 504.

In some embodiments, the format or structure of an announcement matches that of a normal transmission. For example, a frame may be transmitted as an announcement. The announcement frame may be a frame defined by the wireless protocol, such as a beacon frame. In some embodiments, the announcement is energy transmitting in a band. Processes such as encoding, modulation, and/or IFFT may not necessarily be applied to an announcement.

In some applications, power consumption may be an issue, and some embodiments may generate an announcement using methods that limit power consumption. For example, rather than powering the MAC and baseband of a listening wireless device to generate an announcement, the MAC and baseband may remain off to conserve power. The radio may be on to transmit energy on a frequency band used to transmit the announcement. Transmitting energy (as opposed to a frame with baseband processing) may also minimize power consumption in detecting wireless device 502. The MAC in detecting wireless device 502 may be turned off and the baseband may turn off some blocks, such as the demodulator, the decoder, or the deinterleaver.

In some embodiments, the band used by listening wireless device 504 to transmit an announcement is not the band normally used. For example, the announcement may be transmitted in a band other than the band used to exchange information between base station 500 and listening wireless device 504. In some embodiments, an additional radio may be included in listening wireless device 504. With an additional radio, detection may be performed while simultaneously transmitting or receiving on the normal band. The band used to transmit an announcement may not necessarily be of the same bandwidth as the band normally used.

Figure 6:
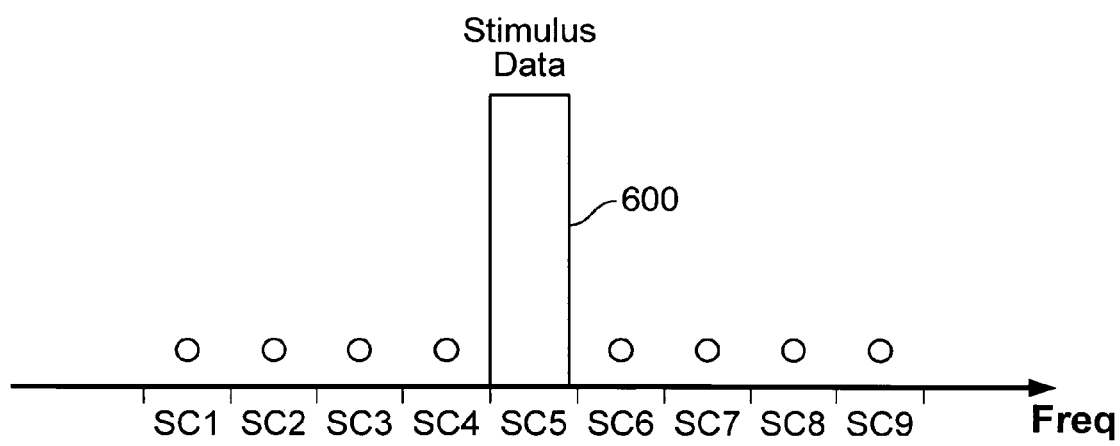
FIG. 6 is a diagram illustrating stimulus data in a subcarrier of a band.

FIG. 6 is a diagram illustrating stimulus data in a subcarrier of a band. In the example shown, a wideband wireless is attempting to detect a narrowband wireless device. Stimulus data 600 is used to stimulate the narrowband wireless device to transmit and be detected. The band illustrated includes 10 subcarriers and each subcarrier may be used to convey data. The normal bandwidth of the detecting wideband wireless device may correspond to the bandwidth of subcarriers SC0 thru SC9 combined. SC5 contains stimulus data 600 and corresponds to a band used by a narrowband wireless device being detected. The rest of the subcarriers are set to zero. A radio of the narrowband wireless device is tuned to a band corresponding to SC5 and the stimulus data is received and processed by the narrowband wireless device.

A baseband may include an IFFT in the transmit path. The IFFT may take the samples of the subcarriers as inputs and generate a time domain signal as the output. Stimulus data 600 for SC5 and zero samples for the rest of the subcarriers may be passed to an IFFT in the baseband to generate a time domain signal for transmission. By passing stimulus data 600 and zero samples to an IFFT, additional hardware may not be needed to stimulate a wireless device being detected.

Stimulus data 600 is assigned to the subcarrier(s) that correspond to a band of interest. In some embodiments, the band of interest is two or more times the bandwidth of a subcarrier and more than one subcarrier includes stimulus data. In some embodiments, stimulus data 600 rotates through subcarriers of interest. For example, a detecting wireless device may be interested in wireless devices that may be using bands corresponding to SC1, SC5 and SC9. A controller may rotate through SC1, SC5, and SC9 to transmit stimulus data in each subcarrier. The controller may track the current subcarrier so a response to the stimulus is properly matched to the corresponding subcarrier.

Stimulus data 600 includes data that triggers a transmission by a listening wireless device when received and processed. For example, stimulus data 600 may be a beacon frame. In some embodiments, stimulus data 600 is retrieved from memory rather than generating stimulus data 600 each time it is transmitted. A detecting wireless device may be able to generate stimulus data 600 each time it is transmitted, but may wish to conserve power. In some cases, a detecting wireless device may not be able to generate stimulus data 600. For example, a wireless device being detected may employ different processing than a detecting wireless device. Retrieving stimulus data 600 from memory may enable a flexible architecture. A detecting wireless device may wish to detect new devices. If stimulus data 600 is retrieved from memory, a software update may be sufficient to generate stimulus data for new wireless devices without changing existing hardware.

Figure 7:
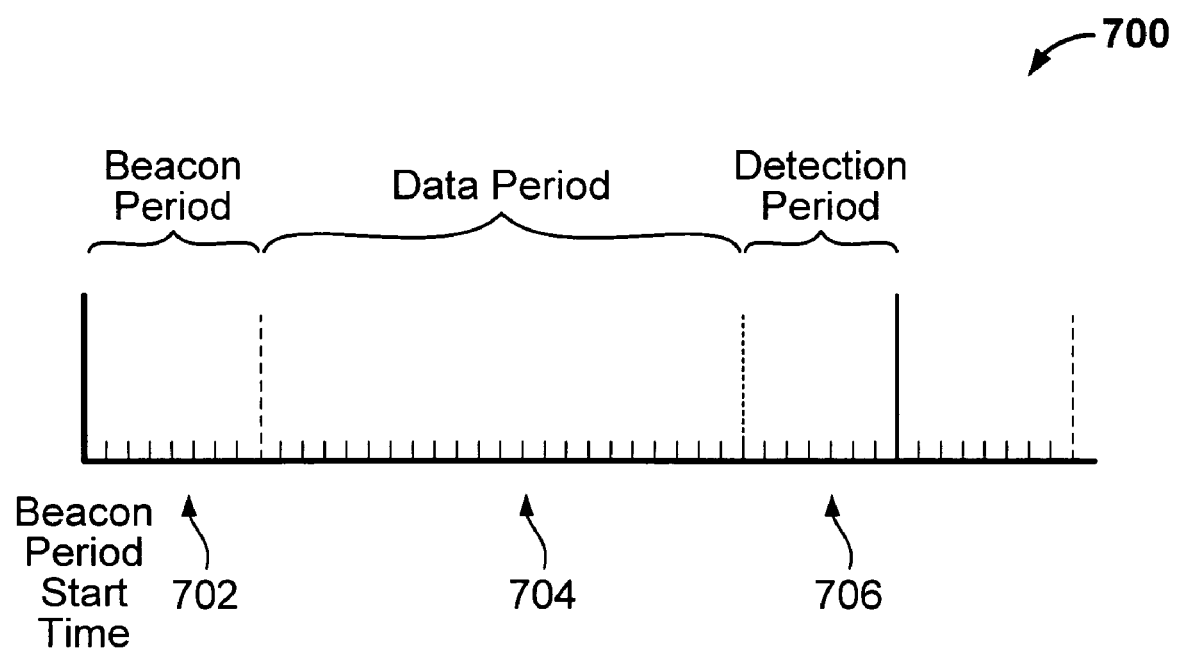
FIG. 7 is a timing diagram illustrating a detection period used to detect wireless devices.

FIG. 7 is a timing diagram illustrating a detection period used to detect wireless devices. In the example shown, superframe structure 700 is associated with a group of wireless devices. A superframe provides a common timing reference for members of a group. Each member of a group tracks the superframe locally and performs certain functions during periods of the superframe. During beacon period 702, members of the group transmit beacon frames. Beacon period 702 is followed by data period 704. Member wireless devices use data period 704 to exchange information. A variety of access mechanisms (such as reservations or contention) may be used to transmit during data period 704. Data period 704 is followed by detection period 706.

Detection period 706 may be used to provide an opportunity for wireless devices being detected to transmit and be detected. Members of the group associated with superframe 700 refrain from transmitting during detection period 706. Detection period 706 includes slots and member wireless devices may communicate the first slot and the duration of detection period 706. Beacon frames transmitted during beacon period 702 may include the first slot and the duration of detection period 706. Wireless devices joining a group may use this information communicated in a beacon frame to determine detection period 706 and refrain from transmitting during that time.

In some embodiments, to conserve power and/or distribute the burden of detecting wireless devices, members of a group may take turns staying awake during the detection period. An awake wireless device processes received data to detect other wireless devices. During detection period 706, some wireless devices may power down while other wireless devices remain awake and perform detection. Determining which wireless devices remain awake may be coordinated. For example, wireless devices may coordinate with each other so only one wireless device is awake each detection period. The sequence of staying awake may follow a sequence of beacon transmissions. The first wireless device to transmit a beacon in the beacon period may stay awake during the first superframe, the second wireless device to transmit may stay awake during the second superframe, and so on. In some embodiments, a random method is used. For example, each wireless device may power down during detection period 706 with some probability. The probability of powering down during detection period 706 may be adjusted. In some applications, power consumption is a concern and the probability of powering down may be increased. In some applications, having at least one wireless device awake and performing detection is a concern and the probability of powering down may be reduced. The probably may be adjusted based on the number of wireless devices in a group.

Figure 8:
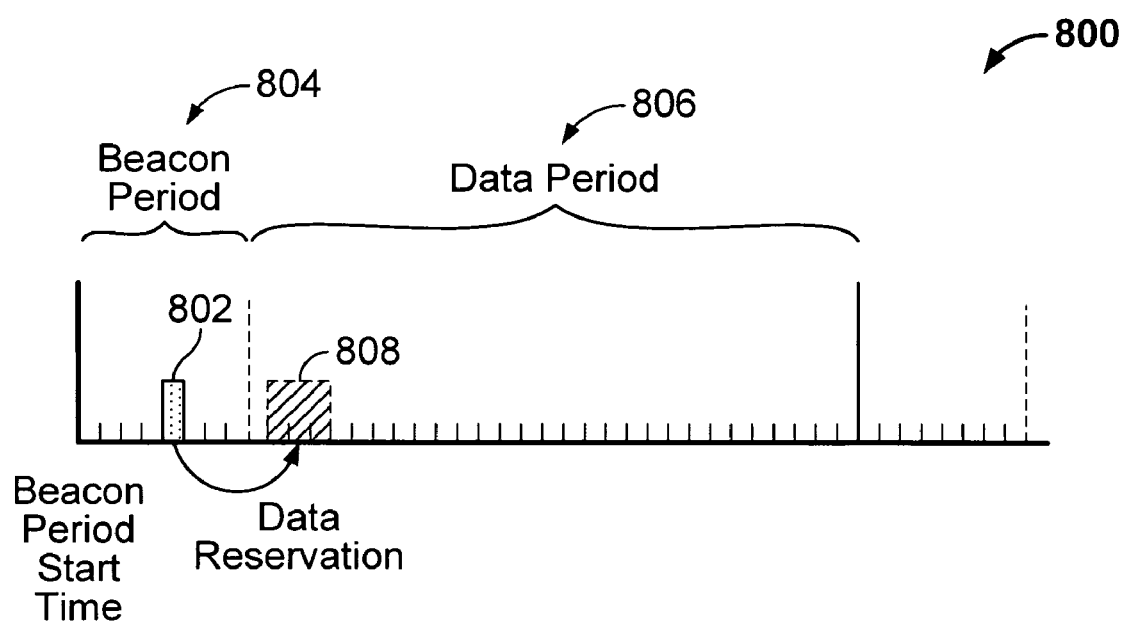
FIG. 8 is a timing diagram illustrating a data reservation used to detect wireless devices.

FIG. 8 is a timing diagram illustrating a data reservation used to detect wireless devices. In the example shown, a wireless device performing detection may be a member of a group of wireless devices. The group uses superframe structure 800 as a common timing reference. Superframe 800 includes beacon period 804 and data period 806. A wireless device may reserve a period in data period 806 by transmitting beacon 802 with data reservation information. Data period 806 may be divided into slots, and beacon 802 may include the beginning slot number and the duration of data reservation 808. Wireless devices receiving beacon 802 are able to determine the beginning and duration of data reservation 808 and refrain from transmitting during the reservation. Although a wireless device may own a data reservation, a wireless device that owns a data reservation does not necessarily need to transmit during the data reservation. A detecting wireless device may use a data reservation to create a window to detect wireless devices.

In some embodiments, each wireless device performs detection using a data reservation. Each wireless device transmits its own beacon with a data reservation. In some embodiments, wireless devices piggyback off of another wireless device's data reservation. For example, an indicator that a data reservation is associated with detection may be included in the beacon. Receiving wireless devices are able to piggyback off the data reservation. One wireless device may own a data reservation but other wireless devices may use the data reservation to detect wireless devices. This may reduce the number of data reservations used for detection in a superframe.

Multiple wireless devices in some embodiments share detection responsibilities and use a common data reservation for detection. For example, detecting wireless device 200 may create a data reservation for detection and wireless devices 202 and 204 may sleep during the data reservation for the first superframe. The data reservation may include an indication that the data reservation is associated with detection and may include an indication that detecting wireless device 200 is performing detection this superframe. During the next superframe, wireless device 202 may use the data reservation to perform detection and devices 200 and 204 may sleep. An indication in the data reservation may communicate that wireless device 202 is performing detection for this superframe. The process may continue and wireless device 204 may take its turn performing detection.

Usage of data reservations in detection may be varied depending on traffic load. For example, if a detecting wireless device has a heavy traffic load, the detecting wireless device may stop using data reservations for detection and service the heavy traffic load. When the traffic load drops, the wireless device may use resume using data reservation to detect wireless devices. In some embodiments, a quality of service associated with a traffic load may be used to determine whether to suspend using data reservations for detection. If the quality of service for a traffic stream is assigned a high quality of service value, a wireless device may suspend using data reservations for detection.

In some embodiments, usage of a given reservation alternates between transmitting data and detecting wireless devices. Alternation between transmitting data and detecting wireless devices may be regularly scheduled. For example, a wireless device may use a reservation to service traffic four out of five superframes and use the reservation in the fifth superframe for detection. A variety of decision methods may be used to determine how to alternate between data transmission and detection. In some embodiments, deciding whether to use a given reservation for detection is based on a traffic load of the wireless device. During heavy traffic, a reservation may be used for detection infrequently. In some embodiments, a traffic profile (including desired servicing and transmission characteristics associated with the traffic) is used to determine how to alternate between detection and data transmission.

In some embodiments, advance scheduling is not used for multiple wireless devices to refrain from transmitting. In some embodiments, each wireless device performs a policy that increases the likelihood of multiple wireless devices refraining from transmitting. Such periods may not be known in advance and may occur on a random basis.

In some embodiments, frequencies that may affect detection, but that are not necessarily the frequencies on which detection is performed, are also silenced. For example, a non-transmission period on an adjacent or nearby band may be created to coincide with a non-transmission period in a band on which detection is performed. The overlapping non-transmission period on the adjacent or nearby band may reduce the noise floor and improve detection of wireless devices. In one example, a detecting wireless device transmits a data reservation to detect wireless devices. The detecting wireless device may change to another band and transmit another data reservation that overlaps with the first data reservation. In some embodiments, a data reservation includes an indication if it is associated with detection. A detecting wireless device may evaluate exiting data reservations on the adjacent band, some of which may be owned by other wireless devices, and determine existing non-transmission periods on the other band. The detecting wireless device may transmit a data reservation on its detection band to coincide with an existing non-transmission period on the other band. A new data reservation on the other band may not necessarily be needed. In some embodiments, a detecting wireless device examines existing data reservations both on its detection band and an adjacent band for indications a reservation is associated with detection. Any overlapping non-transmission times may be used by the wireless device to perform detection on its detection band.

Figure 9A:
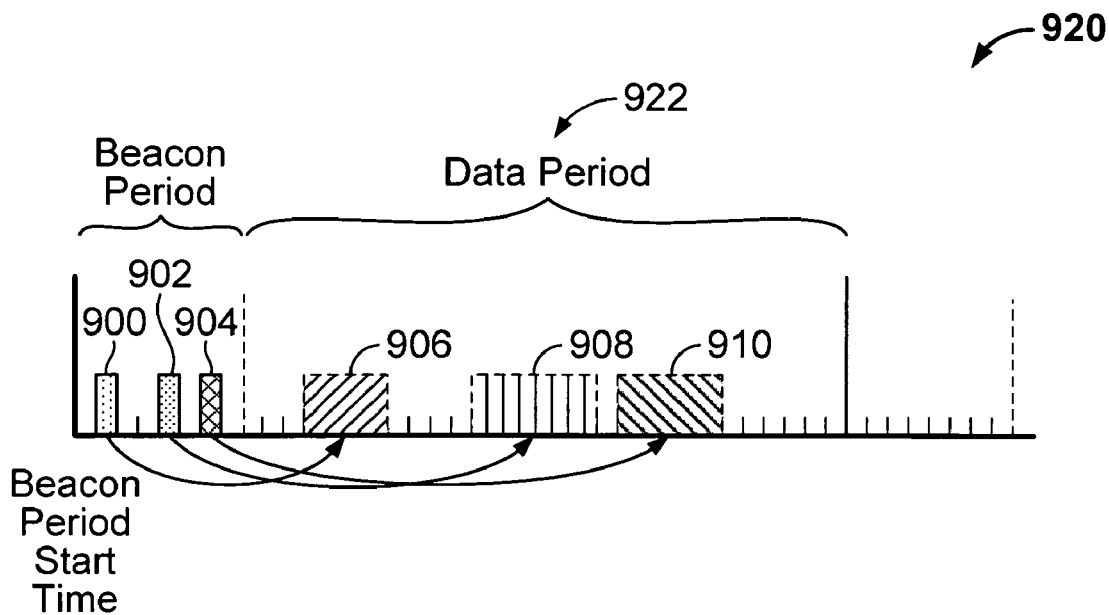
FIG. 9A is a timing diagram illustrating data reservations in a superframe structure.

FIG. 9A is a timing diagram illustrating data reservations in a superframe structure. In the example shown, three wireless devices transmit beacons with data reservations. The wireless devices may be members of a group with superframe 920 as a common timing reference. Beacon 900 creates data reservation 906, beacon 902 creates data reservation 908, and beacon 904 creates data reservation 910. During data reservations, an owning wireless device may transmit or receive.

A policy may be applied at each wireless device to promote a detection environment. Each wireless device may shift its data reservation so data reservations 906, 908, and 910 congregate together. With such a policy, there may tend to be a low energy portion of data period 922. Listening wireless devices may transmit and be detected if data reservations 906, 908, and 910 congregate in one portion of the data period 922.

Figure 9B:
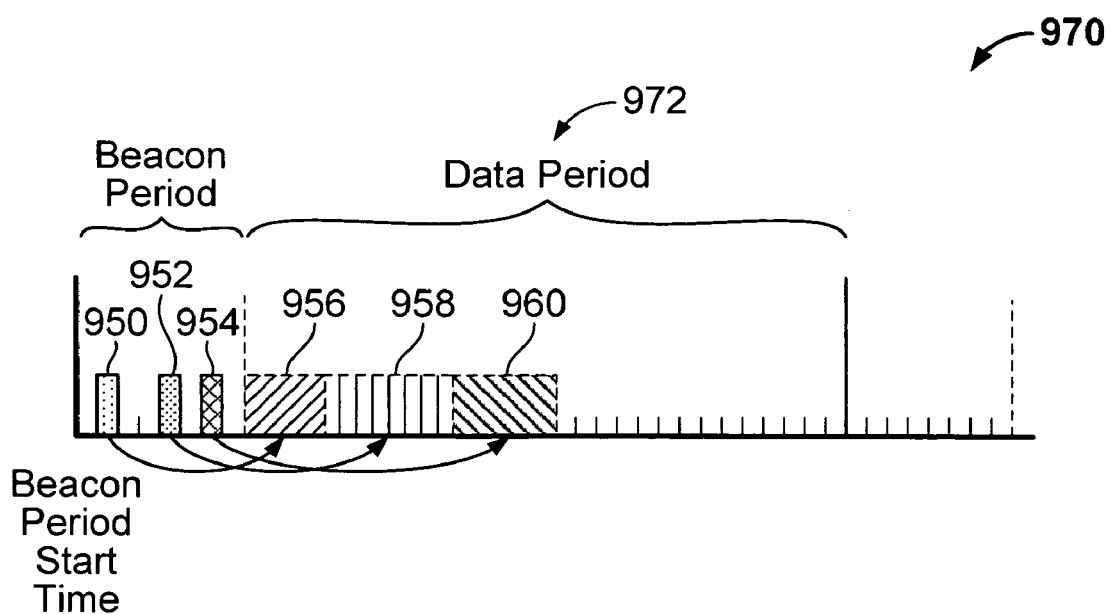
FIG. 9B is a timing diagram illustrating data reservations congregated together in a superframe structure.

FIG. 9B is a timing diagram illustrating data reservations congregated together in a superframe structure. The example shown may reflect superframe structure 920 after each wireless device shifts its data reservation. A shift may be communicated to other wireless devices using a beacon. For example, a new beginning slot for data reservation 906 may be determined and communicated using a beacon. A shift may occur over multiple superframes periods. To avoid collisions in the process of shifting, each wireless device may shift its data reservation to the slot adjacent to a prior data reservation. Data reservation 906 is shifted to begin at the first slot, data reservation 908 is shifted to begin at the slot following data reservation 906 (data reservation 908 is 4 slots long, so this corresponds to the $8^{th}$ slot), and data reservation 910 is shifted to begin at the slot following data reservation 908 (data reservation is 6 slots long, so this corresponds to the $18^{th}$ slot). New reservations may be added after data reservation 910 to avoid collisions. This process may be repeated to produce superframe 970. Data reservations 956, 958, and 960 congregate towards the beginning of data period 972. Beacons 950, 952, and 954 are used to indicate the beginning slot and duration of the associated data reservations. The portion of data period 972 unoccupied by data reservations 956, 958, and 960 may be used to detect wireless devices.

Shifting data reservations may reduce control logic compared to using a data reservation or a detection period. No decision to determine whether to allocate resources for detection is performed. Shifting data reservations may also be preferred in some traffic scenarios. In one example, traffic loads are unevenly distributed between wireless devices. A wireless device with a light traffic load may be unaware that another wireless device has a heavy traffic load. Since no portion of superframe 970 is explicitly allocated for detection, the wireless device with the heavy traffic load may add additional data reservations or contend for unreserved resources to service its heavy traffic load. This may be preferred in some applications.

In some embodiments, a traffic profile describing characteristics of the traffic may be used to decide whether to shift data reservations. For example, it may be undesirable in some applications (such as video or audio applications with regular service intervals) to increase contiguous idle time and shifting data reservations may be undesirable. A traffic profile may indicate a desired regular service interval associated with a traffic stream and may be used to determine whether or not to shift data reservations.

Figure 10:
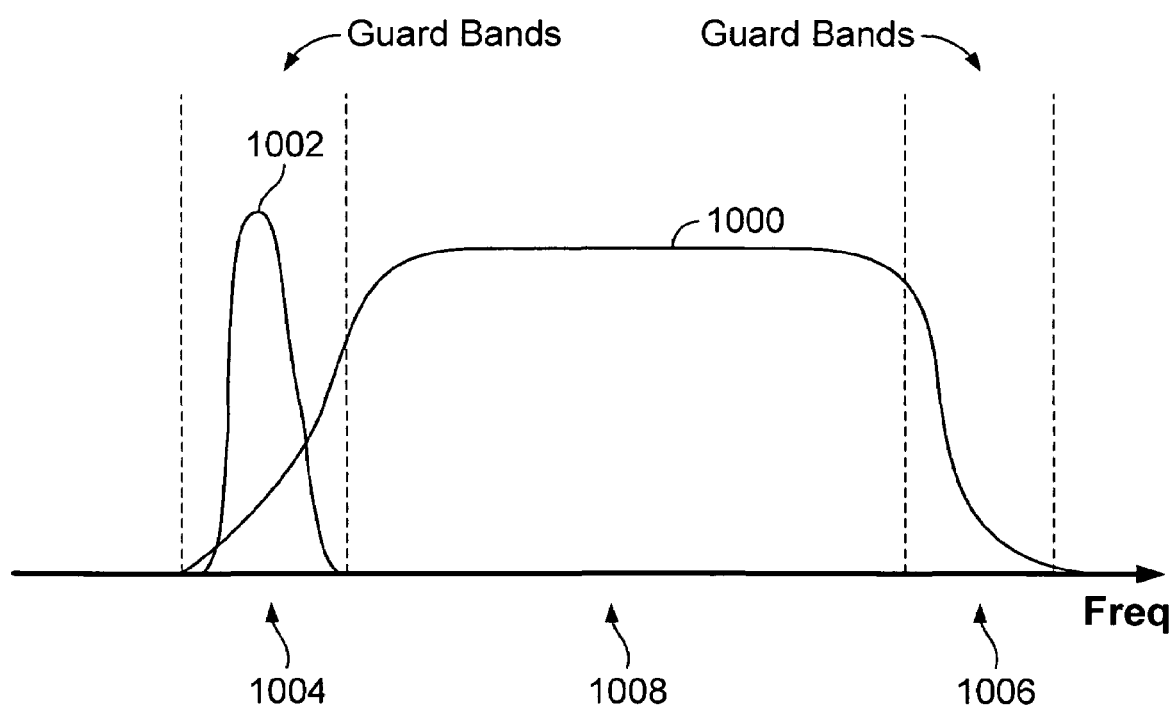
FIG. 10 is a spectrum illustrating an embodiment of using guard bands to detect a wireless device.

FIG. 10 is a spectrum illustrating an embodiment of using guard bands to detect a wireless device. In the example shown, signal 1000 is transmitted by a wideband wireless device performing detection. Most of the energy of signal 1000 is transmitted in band 1008. Guard bands 1004 and 1006 surround band 1008 and are used as transition bands over which the power of signal 1000 is gradually reduced. There may be low energy in guard bands compared to a band used for transmission, such as band 1008. In some embodiments, band 1004 is dedicated for detection with respect to a device being detected. That is, band 1004 may not be used normally by a transmitter of signal 1002.

Signal 1002 is transmitted by a device being detected, for example wireless device 504. Announcement data may be transmitted in signal 1002. Since signal 1002 is transmitted in guard band 1004, the noise floor is low compared to signal 1002 and signal 1002 may be more easily detected and/or processed. In some embodiments, sophisticated announcement data may be used in signal 1002. A frame with encoding and modulation processing may be used as announcement data. The announcement data may include information about the wireless device that transmitted signal 1002. For example, information about traffic load, scheduled data exchanges, priority levels associated with pending traffic, or band(s) used by the transmitting wireless device may be communicated in signal 1002. A device performing detection may use announcement data to determine whether to avoid the wireless device or decide how to avoid the wireless device. In some embodiments, announcement data is not sophisticated. Signal 1002 may be energy, or unmodulated or unencoded data. In some embodiments, the mere detection of signal 1002 may be used to detect a wireless device.

In some embodiments, signal 1002 is not necessarily transmitted in response to received information. For example, signal 1002 may be transmitted periodically. As devices performing detection enter the vicinity of the transmitting device, they may become aware of the presence of the wireless device. In some embodiments, signal 1002 is transmitted on multiple bands. For example, a wireless device may alternate between transmitting announcement data on a first band and a second band.

In some embodiments, a wireless device transmitting announcement data in signal 1002 is configurable to support flexible announcement data. For example, a wireless device may be configured with the location of announcement data and fetch the data from the specified location. If the format of the announcement data, or processing of the data (such as any modulation or encoding applied to the data) changes, firmware or software may be updated to implement the changes, and existing hardware may not need to be changed. In some embodiments, announcement data may be selected from predefined announcement data. For example, two sets of announcement data may be prepared, each of which corresponds to a different device performing detection. If the transmitting wireless device wishes to alert one of the devices performing detection, the appropriate set of announcement data is selected.

To limit the amount of additional hardware to support transmitting signal 1002, in some embodiments, processing such as modulation and encoding are not performed. For example, a radio associated with band 1004 may be used. This radio may be in addition to a radio associated with a band used normally by the wireless device being detected. The additional radio associated with band 1004 may not necessarily be coupled to a baseband. Data inputs of the additional radio may be tied off to generate a signal 1002 with a desired power level. Inputs of the additional radio associated with selecting the band may not necessarily be tied off. A controller may change band selection inputs to select band 1004 or another appropriate band. In some embodiments, values passed to data inputs of the radio are obtained from a location in memory. For example, a frame with processing applied to the frame may be prepared and stored in memory.

A number of embodiments and examples are presented in the above figures. Although a particular method may have been described with respect to one figure, the methods described may be combined. Issues (such as power consumption, a flexible design, or additional components to support detection) discussed in the context of one embodiment may be used to make design decisions and appropriate modifications with respect to another embodiment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of announcing to a detector of a wireless device comprising:
   receiving a signal transmitted by the detector; and
   in response to the received signal:
      obtaining an announcement regarding the presence of the receiving wireless device, wherein:
         the receiving wireless devices occupies a wireless channel, including at least some portion of a time domain and at least some portion of a frequency domain; and
         the announcement includes information associated with the portion of the time domain occupied by the receiving wireless device and/or the portion of the frequency domain occupied by the receiving wireless device; and
      transmitting the announcement in a wireless medium to the detector of the wireless device, wherein the receiving wireless device is a member of a first set of wireless devices and the detector is a member of a second set of wireless devices.

2. A method as recited in claim 1, wherein the wireless device includes a narrowband wireless device.

3. A method as recited in claim 1 further including identifying a band used to transmit the announcement in the wireless medium.

4. A method as recited in claim 1, wherein the detector of a wireless device includes an ultrawideband (UWB) wireless device.

5. A method as recited in claim 1, wherein transmitting the announcement occurs periodically.

6. A method as recited in claim 1, wherein transmitting the announcement includes using a band that is dedicated for detection.

7. A method as recited in claim 1, wherein transmitting the announcement includes using a band that, with respect to the wireless device, is dedicated for detection.

8. A method as recited in claim 1, wherein transmitting the announcement includes using a band that, with respect to the detector, is a band dedicated for detection.

9. A method as recited in claim 1, wherein transmitting the announcement includes using a band that is a guard band.

10. A method as recited in claim 1, wherein transmitting the announcement includes transmitting the announcement in a plurality of bands.

11. A method as recited in claim 1, wherein the wireless device is in a process of joining a group while transmitting the announcement.

12. A method as recited in claim 1, wherein the announcement includes a frame.

13. A method as recited in claim 1, wherein the announcement includes energy.

14. A method as recited in claim 1, wherein obtaining an announcement includes obtaining a location containing the announcement.

15. A method as recited in claim 1, wherein the announcement includes a predetermined announcement.

16. A method as recited in claim 1, wherein obtaining an announcement includes selecting an announcement from a plurality of announcements.

17. A system for announcing to a detector of a wireless device comprising:
- a receiver configured to receive a signal transmitted by the detector;
- a processor configured to obtain an announcement regarding the presence of the receiving wireless device in response to the received signal, wherein:
    - the receiving wireless devices occupies a wireless channel, including at least some portion of a time domain and at least some portion of a frequency domain; and
    - the announcement includes information associated with the portion of the time domain occupied by the receiving wireless device and/or the portion of the frequency domain occupied by the receiving wireless device; and
- a transmitter configured to transmit the announcement in a wireless medium to the detector of the wireless device in response to the received signal, wherein the receiving wireless device is a member of a first set of wireless devices and the detector is a member of a second set of wireless devices.

18. A system as recited in claim 17 further comprising:
- a first radio device associated with a first set of bands; and
- a second radio device associated with a second set of bands.

19. A system as recited in claim 17 further comprising:
- a first radio device associated with a first set of bands used for detecting; and
- a second radio device associated with a second set of bands.

20. A computer program product for announcing to a detector of a wireless device, the computer program product being embodied in a computer readable medium and comprising computer instructions for:
- receiving a signal transmitted by the detector; and
- in response to the received signal:
    - obtaining an announcement regarding the presence of the receiving wireless device, wherein:
        - the receiving wireless devices occupies a wireless channel, including at least some portion of a time domain and at least some portion of a frequency domain; and
        - the announcement includes information associated with the portion of the time domain occupied by the receiving wireless device and/or the portion of the frequency domain occupied by the receiving wireless device; and
    - transmitting the announcement in a wireless medium to the detector of the wireless device, wherein the receiving wireless device is a member of a first set of wireless devices and the detector is a member of a second set of wireless devices.

* * * * *